US005111902A

United States Patent [19]

Sundeen et al.

[11] Patent Number: 5,111,902

[45] Date of Patent: May 12, 1992

[54] AUTOMATIC POWER DOOR LOCK SYSTEM

[75] Inventors: Arthur R. Sundeen, Lansing; Darryl L. Burris, Holt; Roger A. Cook, Okemos; Dennis M. Lombardo, Haslett, all of Mich.

[73] Assignee: General Motors Corporation, Detroit, Mich.

[21] Appl. No.: 699,034

[22] Filed: May 13, 1991

[51] Int. Cl.[5] .......... B60R 28/12

[52] U.S. Cl. .......... 180/281; 307/10.1

[58] Field of Search .......... 180/281, 271, 273; 307/10.1

[56] References Cited

U.S. PATENT DOCUMENTS

| | | | |
|---|---|---|---|
| 2,031,281 | 2/1936 | Roberts | 180/281 |
| 3,722,615 | 3/1973 | Okada et al. | 180/281 |
| 3,765,502 | 10/1973 | Mark | 180/271 |
| 3,871,474 | 3/1975 | Tomlinson et al. | 180/273 |
| 4,709,776 | 12/1987 | Metz | 180/281 |
| 4,829,439 | 5/1989 | Otobe | 123/179 R |

OTHER PUBLICATIONS

"Mechanical Engineering" Mar. 1956. p. 260.

*Primary Examiner*—Charles A. Marmor
*Assistant Examiner*—Karin Tyson
*Attorney, Agent, or Firm*—Jimmy L. Funke

[57] ABSTRACT

A system is described for automatically locking the doors of a vehicle equipped with electric power locks, wherein a first mode of operation is provided for vehicles having automatic transmissions and a second mode of operation is provided for vehicles having manual transmissions. The system includes means for sensing vehicle operating conditions necessary for locking vehicle doors in accordance with the two operating modes, and means for determining whether the vehicle has an automatic transmission. For vehicles having automatic transmissions, the system issues a door locking signal to lock the power door locks after an off-to-on transition of the vehicle ignition system is detected, when the automatic transmission is shifted from either the park or neutral range with the vehicle front doors closed. For vehicles having manual transmissions, the system issues a door locking signal to lock the power door locks after an off-to-on transition of the vehicle ignition system is detected, when the the speed of the vehicle exceeds a predetermined threshold speed with the vehicle front doors closed.

10 Claims, 2 Drawing Sheets

AUTOMATIC POWER DOOR LOCK SYSTEM

BACKGROUND OF THE INVENTION

This invention relates to a system for automatically locking the doors of a motor vehicle equipped with electric power door locks, and more particularly, to an automatic door locking system, which provides one mode of operation for vehicles equipped with automatic transmissions and a second mode of operation for vehicles equipped with manual transmissions.

Conventional electric power locks have been used extensively in automobiles, to provide a convenient way for locking and unlocking vehicle doors. Typically, each door is provided with a door latching mechanism, which is mechanically linked to an electrically reversible locking motor. A centralized relay assembly having separate locking and unlocking relay coils is used to appropriately actuate the electric motors to drive the latching mechanisms to lock or unlock the vehicle doors. The relay coils are remotely energized by door lock switches located near the vehicle driver and passengers.

When a vehicle is furnished with electric power locks, it is desirable to provide a means for automatically locking the vehicle doors, at least initially after starting the vehicle engine, to aid the vehicle occupants, who may have forgotten to do so. This prevents unauthorized door openings, for example, when the vehicle is stopped at a traffic signal.

In the past, systems have been provided for automatically locking the doors, when a vehicle is driven above a predetermined speed. This type of system functions satisfactorily for vehicles equipped with manual and automatic type transmissions; however, when possible, it has been found desirable to base automatic door locking on a more direct driver input. To this end, vehicles equipped with automatic transmissions have been furnished with systems that automatically lock the doors, whenever the transmission is shifted from park to a different range, as indicated by a transmission shift selection switch. Although this mode of automatic door locking is preferable, it is not readily applicable to vehicles having manual transmissions, since these vehicles may be started with the transmission in any gear, and a shift selection switch is normally not provided.

Consequently, a primary disadvantage associated with these prior systems is that vehicles equipped with automatic transmissions require automatic locking systems, which differ from those of vehicles having manual transmissions, when the more preferred mode of automatic door locking is to be used with each type of transmission.

SUMMARY OF THE INVENTION

The present invention is directed toward providing an automatic door locking system that can be interchangeably used in vehicles having automatic and manual transmissions. This is achieved by enabling the system to determine whether a vehicle is equipped with an automatic or manual type transmission, and then providing a first mode for automatically locking the doors when the vehicle has an automatic transmission, and a second mode for automatically locking the doors when the vehicle has a manual transmission. As a result, the system can be used interchangeably on vehicles having automatic and manual transmissions, while providing the more preferred automatic locking mode for each transmission type.

According to one aspect of the invention, a door locking signal is issued to lock the power door locks of a vehicle having an automatic transmission, after an ignition system off-to-on transition is detected, when the automatic transmission is shifted from the park or neutral range and the vehicle front doors are closed. This provides more direct control over the automatic locking feature, since a vehicle driver must shift the automatic transmission from park or neutral before the doors will be automatically locked.

According to another aspect of the invention, a door locking signal is issued to lock the power door locks of a vehicle having a manual transmission, after an ignition system off-to-on transition is detected, when the vehicle is operated at a speed that exceeds a predetermined threshold speed and the vehicle front doors closed. Thus, the system provides an automatic locking mode for vehicles equipped with manual transmissions, which normally do not include any means for detecting transmission shifts.

As contemplated by a further aspect of the invention, the system is reset after the first door locking signal is issued to inhibit the further issuance of additional door locking signals, until the next ignition system off-to-on transition is detected. This resetting of the system ensures that the vehicle doors will be automatically locked, only once for each off-to-on transition of the ignition system. As a result, the system prevents the continuous relocking of vehicle doors after the vehicle is started, which can be annoying to vehicle occupants.

According to yet another aspect of the invention, the automatic door lock system determines that a vehicle is equipped with an automatic transmission, by sensing the presence of a shift selector positioned in the park or neutral shift range of the automatic transmission, after the vehicle ignition system is energized. Since vehicles equipped with automatic transmissions normally can only be started with the shift selector in park or neutral, the present technique affords a reliable and convenient method for determining when a vehicle is equipped with an automatic transmission.

In still another aspect of the invention, the system automatically locks the vehicle doors, only when both front doors of the vehicle are closed. This prevents the system from issuing a locking signal, when the vehicle is started and then driven with a front door open, such as might occur in a valet parking situation. Here, if the system issues a door locking signal to the power lock of an open front door, the door would lock upon being closed, perhaps with the vehicle keys still in the ignition. This problem is avoided in the present invention by inhibiting the issuance of the automatic door locking signal whenever one of the vehicle front doors is open.

These and other aspects and advantages of the invention may be best understood by reference to the following detailed description of the preferred embodiment when considered in conjunction with the accompanying drawings.

DESCRIPTION OF THE PREFERRED EMBODIMENT

Figure 1:
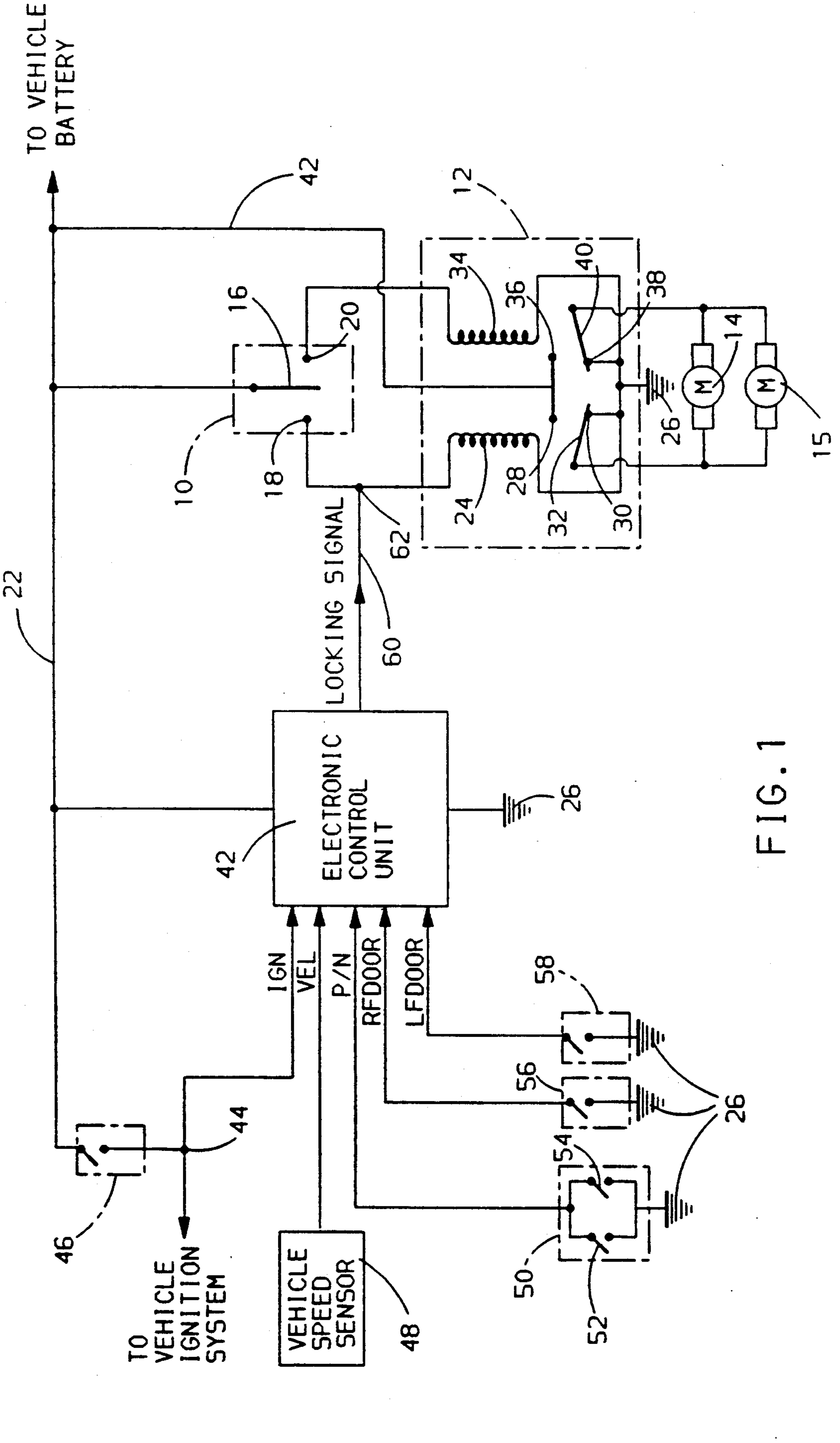
FIG. 1 is a schematic diagram illustrating an electronic control unit programmed to operate as an automatic vehicle door locking system, in accordance with the principles of the present invention.

Referring to FIG. 1. there is shown schematically portions of a conventional electric power door lock system for a motor vehicle, which includes a door lock switch 10, a central door lock relay assembly 12, and two electrically reversible door locking motors 14 and 15 for moving the latching mechanisms (not shown) of their respective doors. In the typical application, each vehicle door would be provided with a door lock switch 10 (only one of which is shown) and a single door locking motor 14 or 15 (only two of which are shown). In a manner described hereinafter, the door lock switch 10 of a vehicle door energizes the centralized door lock rely assembly 12 so that door locking motors 14 and 15 either lock or unlock all vehicle doors, depending upon the position of the door lock switch 10.

Door lock switch 10 is a standard single pole-double throw type, wherein movable contact 16 can be placed in electrical contact with either of its stationary switch contacts 18 or 20. Movable contact 16 is coupled to the ungrounded terminal of the vehicle battery (not shown) through lead 22, with the opposite battery terminal connected to a vehicle ground point. In what follows, the vehicle ground is assumed to be the same point electrically throughout the system, and it will be illustrated with the standard ground symbol, and referenced by numeral 26.

When movable contact 16 is placed in electrical contact with stationary contact 18, a path is provided for electrical current to flow from the vehicle battery, through a locking relay coil 24, and back to the battery through the vehicle ground 26. Associated with locking relay coil 24 are two stationary relay contacts 28 and 30, and a movable relay contact 32. Movable relay contact 32 is biased to normally make electrical contact with stationary relay contact 30. When the locking relay coil 24 is energized with current, movable relay contact 32 is pulled away from its normal position, and moved into electrical contact with stationary relay contact 28.

In a similar fashion, when movable contact 16 of switch 10 is moved into contact with stationary contact 20, a path is provided for electrical current to flow from the vehicle battery, through unlocking relay coil 34, and back to the battery through the vehicle ground 26. Also associated with unlocking relay coil 34 are two stationary relay contacts 36 and 38, and a movable relay contact 40, which is biased to normally be in electrical contact with relay contact 38. When unlocking relay coil 34 is energized with current, movable relay contact 40 is pulled away from its normal position, and moved into electrical contact with stationary relay contact 36.

Although only one door lock switch 10 is illustrated in FIG. 1, each vehicle door is normally equipped with such a switch, with all of the door lock switches then connected in parallel across the locking relay assembly 12. When locking relay coil 24 is energized by the appropriate movement of one such door lock switch 10, a path is established for electrical current to flow from the vehicle battery over lead 42, through closed relay contacts 28 and 32, to the electrical motors 14 and 15. This current activates the motors 14 and 15, which then move in a direction to lock their respective door latch mechanisms. The current passing through the motors 14 and 15. is provided a return path to vehicle ground 26. and back to the battery, through the normally closed relay contacts 38 and 40.

Likewise, when the unlocking relay coil 34 is energized, by switch 10, current flows from the vehicle battery through closed relay contacts 36 and 40, to the electric motors 14 and 15. The current passing through the motors 14 and 15 in this direction is provided a return path to vehicle ground 26, through the normally closed relay contacts 30 and 32. In this case, electric motors 14 and 15 move in the opposite direction to unlock their respective door latch mechanisms, due to the reversed direction of current flow through the motors 14 and 15.

When a vehicle is furnished with the above described electric power locks, it is also desirable to provide a means for automatically locking the vehicle doors, at least initially after starting the vehicle engine, to aid the vehicle occupants, who may have forgotten to do so. This prevents unauthorized door openings, for example, when the vehicle is stopped at a traffic signal.

Prior systems have provided a mode for locking vehicle doors automatically, when the vehicle is driven above a predetermined speed. This type of system functions satisfactorily for vehicles equipped with manual and automatic type transmissions; however, when possible, it has been found desirable to base automatic door locking on a more direct driver input. To this end, vehicles equipped with automatic transmissions have previously been provided with systems that automatically lock vehicle doors, whenever, the transmission range selector is shifted from park to a different range, as indicated by the transmission shift selection switch. Although this mode of automatic door locking is preferable, it is not readily applicable to vehicles having manual transmissions, since these vehicles may be started with the transmissions in any gear, and a shift selection switch is normally not provided. Consequently, a primary disadvantage associated with these prior systems is that vehicles equipped with automatic transmissions require different systems from vehicles having manual transmissions, if the more preferred mode of automatic door locking is to be used with each type of transmission.

The present invention is directed toward eliminating the above stated disadvantage, by furnishing an automatic door locking system that can be used interchangeably in vehicles having either automatic or manual transmissions, while providing the desired automatic locking mode for each kind of transmission. This is achieved by enabling the system to determine whether the vehicle is equipped with an automatic or manual type transmission, and then providing different modes for automatically locking the doors based upon the kind of transmission.

The system includes means for sensing vehicle operating conditions necessary for locking the vehicle doors in accordance with each mode of operation. If the vehicle is found to have an automatic transmission, the system issues a door locking signal to lock the vehicle power locks after sensing vehicle operating conditions necessary to function according to a first mode of operation. If the vehicle is found not to have an automatic transmission, a door lock signal is issued after sensing the vehicle operating conditions necessary to function according to a second mode of operation, which is satisfactory for manual type transmissions. Thus, the system can be used interchangeably in vehicles having either automatic or manual transmissions, and provides separate automatic door locking modes for each type of transmission.

Referring again to FIG. 1, the preferred embodiment of the present invention is shown implemented in the form of a programmed electronic control unit (ECU) 42. As will be recognized by those skilled in the art of modern microprocessor control, conventional ECU 42 includes the standard elements of a central processing unit, random access memory, read only memory, clock circuitry, regulated power supplies, and input/output conditioning circuitry.

As illustrated, the ECU 42 receives various input signals related to the status of different vehicle operating conditions. As will be described subsequently, the system requires these input signals to determine whether the conditions necessary for automatically locking the vehicle doors have occurred.

An IGN input signal is provided to indicate the off-/on status of the vehicle ignition system (not shown), and is most easily obtained by monitoring the voltage applied to the ignition system at junction 44. When the ignition system is in the off state, junction 44 and the IGN input will be at ground potential. However, when switch 46 is closed, the vehicle battery voltage is applied to junction 44, thereby energizing the ignition system, and changing the voltage potential of the IGN input signal to that of the battery. Switch 46 represents a portion of a conventional ignition switch, which is closed during both cranking and running of the vehicle engine.

A VEL input signal to ECU 42 is derived from a standard vehicle speed sensor 48, which is customarily mounted on the vehicle transmission to produce pulsed signals, at a frequency proportional to speed of the vehicle. The ECU 42 derives an indication of the vehicle speed by counting the number of pulses occurring in the VEL input signal, during a fixed time interval.

The ECU 42 is provided with a P/N input signal, which is obtained differently, depending upon the type of transmission present in the vehicle. If the vehicle is equipped with an automatic transmission, the P/N signal is derived from a conventional shift selector switch 50, as illustrated in FIG. 1. When the automatic transmission shift selector is positioned in the park or neutral range, the contacts of internal switch 52 or 54 are respectively closed, short circuiting the P/N input to vehicle ground 26. When the P/N input is not shorted to ground, it is maintained at a voltage potential different from that of vehicle ground 26, by the ECU 42. This may be accomplished, for example, by internally connecting the P/N input to a source of voltage within ECU 42, with an appropriate series resistor to limit the current flow, when the P/N input is short circuited to ground by the closing of switch 52 or 54. Consequently, the P/N signal will assume the ground potential, when the shift selector is positioned in either the park or neutral range. If the vehicle is equipped with a manual rather than an automatic transmission, the shift selector switch 50 will not be available, and the P/N input can not be connected as shown in FIG. 1. In this case, the P/N input is left unconnected, and as previously stated, the ECU 42 will continuously maintain the P/N signal at a voltage potential different from that of the vehicle ground 26.

The two input signals RFDOOR and LFDOOR are derived from switches 56 and 58, which indicate the open/closed condition of the right front and left front vehicle doors, respectively. As with the P/N input, the ECU 42 maintains the RFDOOR and LFDOOR inputs at voltage potentials different from vehicle ground 26, as long as the contacts of switches 56 and 58 are not closed. The switches 56 and 58 may be standard door jam switches, that are customarily located on the right and left front vehicle door pillars, and are closed or switched to ground, when their respective vehicle door is opened. Alternatively, switches 56 and 58 could take the form of standard microswitches positioned to switch to ground, as soon as the opening handle of the associated door is moved by a vehicle occupant. Although the contacts of switch 56 and 58 are assumed to close, upon the opening of a vehicle door in this embodiment, switches having open contacts, when the doors are open, could also be used. It is only necessary that voltage potentials of the RFDOOR and LFDOOR input signals change in a known fashion, in response to the opening and closing of their associated doors.

The ECU 42 is supplied with electrical power from the vehicle battery through its connections to lead 22 and the indicated vehicle ground 26. As a consequence, ECU 42 is continuously powered by the battery, even when the contacts of the ignition switch 46 are open and the ignition system is not energized.

Based upon the various input signals, and in a manner to be described hereinafter, ECU 42 senses the vehicle operating conditions that are necessary for automatically locking the vehicle doors. After the necessary conditions have been detected, ECU 42 issues a pulsed door LOCKING SIGNAL on output lead 60. The pulsed LOCKING SIGNAL enters the power door lock circuit at junction 62, and proceeds to energize the locking relay coil 24 of the locking relay assembly 12. The door latching mechanisms are then locked, in response to the current flowing through locking relay coil 24, as described previously.

Figure 2:
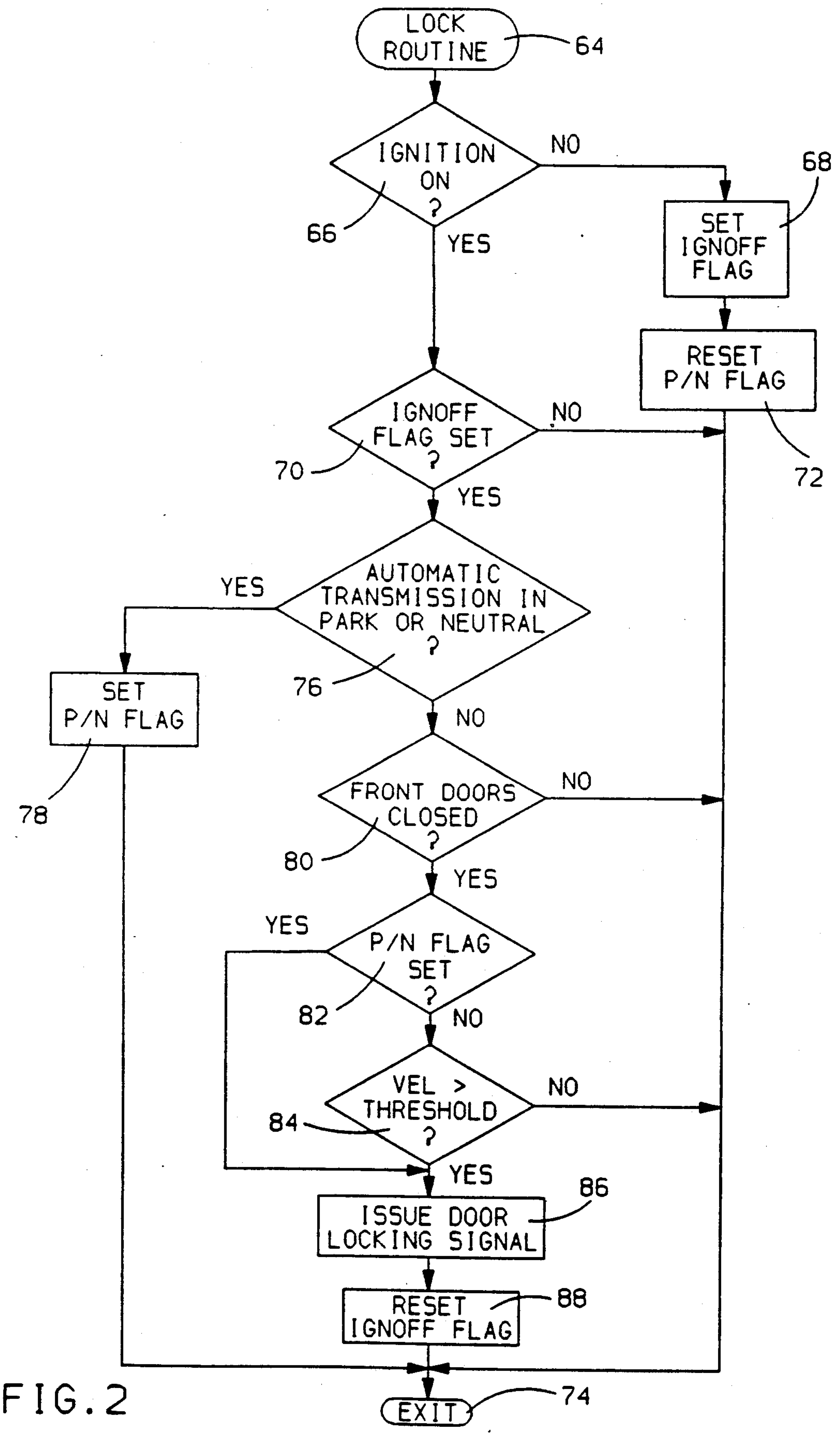
FIG. 2 is a flow diagram representative of the program steps executed by the electronic control unit of FIG. 1. when operating as an automatic door locking system, in accordance with the principles of the present invention.

Referring now to FIG. 2, there is shown a simplified flow diagram illustrating steps in a LOCK ROUTINE stored and executed by ECU 42, in providing an automatic door locking system that operates in accordance with the principles of the present invention. Since the ECU 42 is typically programmed to perform other functions (such as controlling interior lighting), in addition to automatic door locking, the LOCK ROUTINE represents only a portion of a main looped program, which is continuously executed by ECU 42 (for example, every 5 milliseconds).

The LOCK ROUTINE is entered at point 64, and proceeds to step 66, where a decision is required as to whether the ignition system is in the on, or off state. The ECU 42 makes this decision based upon the voltage potential of the IGN input signal. If the IGN input is at ground potential, the ignition system has not yet been turned on, and the routine passes to step 68. However, if the IGN input is at the voltage potential of the vehicle battery, the ignition system has been turned on, and the routine then proceeds to step 70.

When the LOCKING ROUTINE is first entered, the contacts of the ignition switch 46 will be open, with the ignition system in the off state. In this case, the routine will proceed from step 66 to step 68.

At step 68 an ignition off flag IGNOFF is set to indicate that the ignition system has not yet been energized. From step 68, the routine passes to step 72, where a P/N flag is reset. This P/N flag is set at a later step, and will be discussed in more detail at that point in the routine.

After resetting the P/N flag, the routine exits at point 74.

Each time the routine is entered, it will proceed from step 66, to steps 68, 72, and 74, as long as the ignition system is in the off state. However, when the contacts of ignition switch 46 are closed to energize the ignition system, the routine will then pass from step 66, to step 70.

At step 70, a decision is required as to whether the IGNOFF flag has previously been set. If the IGNOFF flag is not set, the routine is exited at point 74. However, if the IGNOFF flag is set (at step 68), then the routine will pass from step 66, through step 70, and to step 76. Consequently, the decisions required at steps 66 and 70, permit the routine to pass to step 76, only upon the detection of an off-to-on transition of the vehicle ignition system.

At step 76, a decision is required as to whether the vehicle is equipped with an automatic transmission having its shift selector positioned in the park or neutral range. The ECU 42 makes this decision based upon the voltage potential of the P/N input signal. As described previously, the P/N signal can only be at ground potential, if shift selector switch 50 is connected to the P/N input, and the contacts of one of its switches 52 (park range) or 54 (neutral range) are closed. As a result, the ECU 42 decides that the vehicle is equipped with an automatic transmission having its shift selector positioned in the park or neutral range, when the P/N input is at ground potential. Since vehicles equipped with automatic transmissions normally can not be started, unless the shift selector is positioned in the park or neutral range, the indication of a grounded P/N input, immediately after the detected ignition system off-to-on transition (at previous steps 66 and 70), affords a reliable and convenient method for determining that the vehicle is equipped with an automatic transmission. If the P/N input is not at ground potential, the first time the routine passes to step 76 after detecting the off-to-on ignition system transition, then it is assumed that the vehicle is equipped with a manual transmission, and the routine proceed to step 80.

When the ECU 42 decides that the vehicle is equipped with an automatic transmission at step 76, the routine passes to step 78, where the P/N flag (previously reset at step 72) is now set. The setting of the P/N flag indicates that the vehicle has an automatic transmission, and that its shift selector is positioned in either the park or neutral range. After the P/N flag is set, the routine exits at point 74. Note that as long as the automatic shift selector is positioned in the park or neutral range, the routine will proceed through steps 76 to step 78. Once the automatic transmission is shifted from the park or neutral positions, the routine will then pass from step 76 to step 80, just as it would do if the vehicle were equipped with a manual transmission, only now, the P/N flag will have been set, by a previous pass through step 78.

Thus, the routine will pass from step 76 to step 80, when the vehicle has a manual transmission, or when the vehicle has an automatic transmission that has been shifted from the park or neutral range, after the vehicle has been started.

At step 80, a decision is required as to whether both vehicle front doors are closed. The ECU 42 bases this decision on the voltage potential of the RFDOOR and LFDOOR inputs. If one of the vehicle front doors is open, then the RFDOOR or LFDOOR input will be grounded, by closure of the associated door switch 56 or 58. As a consequence, if the ECU 42 senses that the voltage of either the RFDOOR or LFDOOR input is at ground potential, then the routine will pass from step 80, and exit at point 74. However, if both inputs RFDOOR and LFDOOR have voltage potentials different from vehicle ground, the vehicle front doors will both be closed, and the routine will proceed to step 82. Note that the present method can easily be extended to detect the closed condition of all vehicle doors before proceeding to step 82, by adding the necessary door switches and inputs to the ECU 42.

At step 82, a decision is required as to whether the P/N flag has been set. Note that the P/N flag will not have been set at step 78, if the vehicle is equipped with a manual transmission, in which case the routine proceeds to step 84.

When the routine passes to step 84, a decision is required as to whether the vehicle is traveling at a speed VEL, which exceeds a predetermined THRESHOLD speed (for example, 8 miles per hour). In making this decision, the ECU 42 compares the vehicle speed VEL, derived from speed sensor 48, with the predetermined THRESHOLD value permanently stored in memory. If VEL is not greater than THRESHOLD, the routine exits at point 74. However, if VEL is greater that THRESHOLD, the routine passes to step 86.

Returning now to step 82, if the vehicle has an automatic transmission, it must have been shifted from either the park or neutral range in order to reach step 82, and the P/N flag will have set in a previously pass through step 78. In this case, the routine proceed directly from step 82 to step 86, bypassing the vehicle speed decision step 84.

At step 86, the ECU 42 issues an appropriate LOCKING SIGNAL pulse on output lead 60. This LOCKING SIGNAL energizes the locking relay coil 24 of the locking/unlocking relay assembly 12, which in turn activates the electric motors 14 and 15 to lock their respective latching mechanisms in the vehicle doors.

From step 86, the routine proceeds to step 88, where the IGNOFF flag is reset. This resetting of the IGNOFF flag ensures that the vehicle doors will be automatically locked, only once, after each off-to-on ignition system transition. In the next pass through the routine, this reset IGNOFF flag will cause the routine to be exited at point 74, through decision step 70. After the ECU detects the next ignition system off-to-on transition, the IGNOFF flag will again be set at step 68, and the ECU 42 can then issue another LOCKING SIGNAL when the proper conditions exist. This aspect of the invention prevents the continuous relocking of doors after the vehicle is started, which can become annoying to vehicle occupants.

An important feature of the invention is made possible by the presence of step 80 in the routine of FIG. 2. This step requires that both vehicle front doors be closed, before a LOCKING SIGNAL can be issued at step 86. This prevents the ECU 42 from issuing a LOCKING SIGNAL, if the vehicle is started and then driven with a front door open, such as might occur in a valet parking situation. Here, if ECU 42 issues a door LOCKING SIGNAL to lock the door latching mechanisms, the front door would lock upon being closed, perhaps with the vehicle keys still in the ignition. This problem is avoided by including step 80 in the automatic locking routine.

In summary, a door LOCKING SIGNAL is issued by ECU 42 (at step 86) to lock the power door locks of a vehicle having an automatic transmission (determined at step 76), after the detection of an off-to-on ignition system transition (established by steps 66, 68, and 70), when the automatic transmission is shifted from the park or neutral range (determined by steps 76, 78, and 82), with the vehicle front doors closed (decided at step 80). This mode of operation provides the vehicle driver with more direct control, since the driver must shift the automatic transmission from park or neutral, before the doors will be automatically locked.

When the vehicle has a manual transmission (determined by steps 76, 78, and 82), a door LOCKING SIGNAL is issued by the ECU 42 (at step 86), after the detection of an off-to-on ignition system transition (established by steps 66, 68, and 70), when the speed of the vehicle exceeds a predetermined threshold speed (determined at step 84), with the vehicle front doors closed (decided at step 80). This provides an automatic door locking mode for vehicles equipped with manual transmissions, that normally do not include any means for detecting transmission shifts.

Thus, the present invention provides an automatic door locking system that can be interchangeably used in vehicles having automatic and manual transmissions, while at the same time enabling the use of the more preferred automatic locking mode, for each kind of transmission.

In the preferred embodiment described above, the invention was implemented in the form of a microprocessor based ECU. It will be recognized by those skilled in the art, that the invention can also be implemented with discrete electronic components and logic circuitry, connected to perform in the same fashion. Also, only the open/closed condition of the vehicle front doors was sensed by the ECU. By including addition door switch inputs to the ECU, the closed condition of all doors could easily be required before issuing a door locking signal.

Thus, aforementioned description of the preferred embodiment of the invention is for the purpose of illustrating the invention, and is not to be considered as limiting or restricting the invention, since many modifications may be made by the exercise of skill in the art without departing from the scope of the invention. .

The embodiments of the invention in which an exclusive property or privilege is claimed are defined as follows:

1. A system for automatically locking the doors of a vehicle equipped with power door locks, which provides a first mode of operation for vehicles having automatic transmissions and a second mode of operation for vehicles having manual transmissions, the system comprising:

means for sensing vehicle operating conditions necessary for automatically locking vehicle doors in accordance with the first and second modes of operation;

means for determining whether the vehicle is equipped with the automatic type of transmission;

means for locking the power door locks after sensing the necessary operating conditions associated with the first mode of operation, when the vehicle is determined to be equipped with the automatic type of transmission; and means for locking the power door locks after sensing the necessary operating conditions associated with the second mode of operation, when the vehicle is determined not to be equipped with the automatic type of transmission.

2. The system of claim 1, wherein the means for determining whether the vehicle is equipped with the automatic type of transmission includes means for indicating when a shift selector associated with the automatic transmission is positioned in either one of a park range and a neutral range.

3. For a vehicle equipped with power door locks and an ignition system, an automatic door locking system, which provides a first mode of operation for vehicles having automatic transmissions and a second mode of operation for vehicles having manual transmissions, the system comprising:

means for detecting an off-to-on transition of the vehicle ignition system;

means for sensing whether the vehicle front doors are closed;

means for deriving an indication of vehicle speed;

means for determining whether the vehicle has the automatic type of transmission, which includes means for indicating when a shift selector associated with the automatic transmission is positioned in either one of a park range and a neutral range;

means for issuing a door locking signal to lock the power locks of the vehicle determined to have the automatic type of transmission, after the off-to-on ignition system transition is detected, when the automatic transmission is shifted from either one of the park and neutral ranges with the vehicle front doors closed; and means for issuing a door locking signal to lock the power locks of the vehicle determined not to have the automatic type of transmission, after the off-to-on ignition system transition is detected, when the indicated vehicle speed exceeds a predetermined threshold speed with the vehicle front doors closed.

4. The system of claim 3, further including means for inhibiting the issuance of more than one door locking signal, until a next off-to-on ignition system transition is detected.

5. The system of claim 3, wherein the vehicle is determined to have the automatic type of transmission, by sensing that the shift selector is positioned in either one of the park and neutral ranges, after the detection of the off-to-on ignition system transition.

6. For a vehicle equipped with power door locks, a method for automatically locking the vehicle doors, which provides a first mode of operation for vehicles having automatic transmissions and a second mode of operation for vehicles having manual transmissions, the method comprising the steps of:

sensing vehicle operating conditions necessary for automatically locking vehicle doors in accordance with the first and second modes of operation;

determining whether the vehicle is equipped with the automatic type of transmission;

issuing a door locking signal to lock the vehicle power door locks after sensing the necessary operating conditions associated with the first mode of operation, when the vehicle is determined to be equipped with the automatic type of transmission; and issuing a door locking signal to lock the vehicle power door locks after sensing the necessary operating conditions associated with the second mode of operation, when the vehicle is determined not to be equipped with the automatic type of transmission.

7. The method of claim 6, wherein the step of determining whether the vehicle is equipped with the automatic type of transmission further includes the step of sensing when a shift selector associated with the automatic transmission is positioned in either one of a park range and a neutral range.

8. A method for automatically locking the doors of a vehicle equipped with power door locks, that provides a first mode of operation for vehicles having automatic transmissions and a second mode of operation for vehicles having manual transmissions, the steps of the method comprising:

detecting an off-to-on vehicle ignition system transition;

sensing whether the vehicle front doors are closed;

deriving an indication of vehicle speed;

determining whether the vehicle has the automatic type of transmission, which includes sensing when a shift selector associated with the automatic transmission is positioned in either one of a park range and a neutral range;

issuing a door locking signal to lock the power locks of the vehicle determined to have the automatic type of transmission, after the off-to-on ignition system transition is sensed, when the automatic transmission is shifted from either one of the park and neutral ranges with the vehicle front doors closed; and issuing a door locking signal to the power locks of the vehicle determined not to have the automatic type of transmission, after the off-to-on ignition system transition is detected, when the indicated vehicle speed exceeds a predetermined threshold speed with the vehicle front doors closed.

9. The method of claim 8, including the further step of inhibiting the issuance of more than one door locking signal, until a next off-to-on ignition system transition is detected.

10. The method of claim 8, wherein the vehicle is determined to have the automatic type of transmission, by sensing that the shift selector associated with the automatic transmission is positioned in either one of the park and neutral ranges, after the detection of the off-to-on ignition system transition.

* * * * *